United States Patent [19]
Netzel et al.

[11] Patent Number: 5,098,224
[45] Date of Patent: Mar. 24, 1992

[54] PROCESS AND DEVICE FOR THE DECONTAMINATION OF CONTAMINATED SITES

[75] Inventors: Wolfgang Netzel, Rosengarten; Wolfgang Sondermann, Dietzenbach-Steinberg; Albert Pielsticker, Appel-Ewersen, all of Fed. Rep. of Germany

[73] Assignee: Keller Grundbau GmbH, Fed. Rep. of Germany

[21] Appl. No.: 754,946

[22] Filed: Sep. 4, 1991

Related U.S. Application Data

[63] Continuation of Ser. No. 374,468, Jun. 30, 1989, abandoned.

[30] Foreign Application Priority Data

Jul. 4, 1988 [DE] Fed. Rep. of Germany ........ 3822747
Jan. 10, 1989 [DE] Fed. Rep. of Germany ........ 3900513

[51] Int. Cl.$^5$ ................................................ B08B 7/04
[52] U.S. Cl. ................................. 405/128; 405/264; 405/267; 405/269; 134/25.1; 166/246; 166/267; 299/7
[58] Field of Search ............ 405/128, 129, 258, 264, 405/267, 270, 269; 134/25.1, 34; 166/246, 266, 267; 299/4, 7

[56] References Cited

U.S. PATENT DOCUMENTS

| | | | |
|---|---|---|---|
| 4,085,972 | 4/1978 | Ghosh et al. | 166/246 X |
| 4,101,333 | 7/1978 | Wayment | 405/267 X |
| 4,212,353 | 7/1980 | Hall | 299/7 X |
| 4,599,117 | 7/1986 | Luxemborg | 134/25.1 |
| 4,640,767 | 2/1987 | Zajic et al. | 166/246 |

Primary Examiner—Randolph A. Reese
Assistant Examiner—Arlen L. Olsen
Attorney, Agent, or Firm—Bierman and Muserlian

[57] ABSTRACT

A process and device for decontamination of contaminated soil wherein contaminated soil is precleansed by a pressurized flushing and cutting jet of a cutting device located in a borehole. The soil is removed from the existing soil structure and flushed so intensely that is largely freed from adhering pollutants. The fine particles of the flushed and precleansed soil, together with the pollutants, are sluiced as a slurry in a return flow through a preventer. For decontamination, they are conveyed to a decontamination plant where the remaining pollutants are extracted. The coarse particles of soil remain in the ground. Finally, the cleansed soil, together with a bonding agent, is flushed back into the borehole where it forms a soil structure capable of bearing loads.

18 Claims, 2 Drawing Sheets

PROCESS AND DEVICE FOR THE DECONTAMINATION OF CONTAMINATED SITES

PRIOR APPLICATION

This application is a continuation of U.S. Patent application Ser. No. 374,468 filed June 30, 1989, now abandoned.

The invention relates to a process for decontaminating contaminated sites and to a device for carrying out this process.

BACKGROUND OF THE INVENTION

For cleansing contaminated sites, there is a prior art process which teaches enclosing a refuse deposit by means of a hydraulic clearing and injecting device. However, this process, which in itself is well proven, does not make it possible to extract the contaminated soil in a specific area, effectively free it from adhering pollutants, and then redeposit the cleansed soil.

BRIEF DESCRIPTION OF THE INVENTION

It is an object of the present invention to provide a process and a device by means of which contaminated soil can be effectively removed and replaced by cleansed soil. The air contained in the soil is decontaminated at the same time.

It is also an object of the invention to design the process and device in such a way that the system for transporting the pollutant-containing fine soil particles to the decontamination plant is sufficiently leakproof. Furthermore, the possibilities for the decomposition of the pollutants, especially at the early stage of extraction from the soil, are reduced.

The process of the Invention makes a considerable contribution towards the decontamination of refuse deposits and the removal of impurities therefrom. It consists in washing the soil in place by means of a highly pressurized flushing and cutting jet, thereby largely freeing it of poisonous substances. The flushed and precleansed fine-grained soil particles are conveyed to the surface in the return flow to undergo a subsequent cleansing treatment, while the coarse soil particles remain in the ground.

In the field of high-pressure technology there is a prior art cutting and injection device. However, this only serves to remove loose soil which is not capable of bearing loads from the existing soil structure and to replace it by load bearing soil member produced from subsequently introduced solid substances.

In contrast to the above, the present invention provides a known cutting device which is used for advantageously precleansing the contaminated soil in the ground itself. The fine grain particles of the flushed and precleaned soil are freed from their remaining pollutants in a cleansing plant and, together with a bonding agent, e.g. cement, they are flushed back into the borehole where the mixture, together with the coarse soil particles remaining in the ground, and water form a soil structure which is capable of bearing loads.

The process in accordance with the invention has a further advantage in that the cutting device can also be used to free the soil from gaseous poisons. This is achieved by adding air and/or gas to the fluid of the flushing and cutting jet. Precleansing of the soil is further intensified by adding hot water and/or steam to the fluid of the flushing and cutting jet. In this way, the degree of decontamination can be increased considerably.

A further special feature of the present invention consists in monitoring and controlling all soil decontaminating operations by a measuring and control unit. The Invention has a further advantage in that the decontaminating operation can be continued until a predetermined degree of decontamination of the soil combined with the achievement of its full load bearing capacity has been obtained.

By designing the device in accordance with the invention, it is possible, with the help of the highly pressurized flushing and cutting jet, to remove the polluted soil from the existing soil structure, thereby initiating the decontamination operation. The operation of flushing out the pollutants can be intensified by adding air and/or gas to the jet stream. To accomplish this, the pipeline system of the high-pressure pump driving the cutting device is provided with suitable connections. The pipeline system is also provided with connections for hot water and/or steam.

The success of the process is insured by the measuring and control unit arranged in the device. This unit permits the degree of decontamination to be monitored, recorded, and controlled at any time. Moreover, the process and device can be used underneath existing buildings, with the existing building structure being fully maintained.

In accordance with the Invention, the efficiency of transporting the already precleansed—but still pollutant-containing—soil to the cleansing plant may be increased by designing the preventer to draw in pollutants in the return flow under vacuum. As is already known, such a preventer comprises a gasproof and waterproof borehole seal incorporating a means to permit rods to pass through and having a closable, regulatable aperture. The vacuum produced and maintained in the preventer, apart from being a transport aid, has a further important function; i.e. the pollutants contained in the fine soil particles in the gaseous state are retained inside the preventer and cannot escape into the atmosphere. Instead, they are passed on to the cleansing plant together with the slurry of fine soil particles. In this way, the required operating and emission protection is insured at all times.

The process is carried out with the inventive device simply by connecting a vacuum pump to the preventer which is arranged in the return flow. This vacuum pump constantly sucks in pollutants so that the site personnel and the environment are protected therefrom.

In addition to this measure, or instead of it, a further embodiment of the invention permits the intensification or improvement of the decomposition of the pollutants. This is achieved by using a bio-substance which is added to the pipeline system via a suitable connection, thereby permitting the contaminated soil extracted by the flushing and cutting jet to be uniformly mixed with the bio-substance to the predetermined required extent. This bio-substance consists of, for example, microorganisms selected so that the respective pollutants are decomposed or altered and, in consequence, destroyed.

According to a further embodiment of the invention, it is also possible for the bio-substance to be added to the recleansed soil prior to, or in the course of, being returned to the borehole. This can take place with or without the bio-substance being added to the flushing and cutting jet. Adding the bio-substance to the recleansed soil is preferably effected via an additional pipeline linking the connection for adding the bio-substance with the pipeline system for returning the recleansed soil into the borehole.

BRIEF DESCRIPTION OF THE DRAWINGS

In the accompanying drawings, constituting a part hereof and in which like reference characters represent like parts.

DETAILED DESCRIPTION OF THE INVENTION

Figure 1:
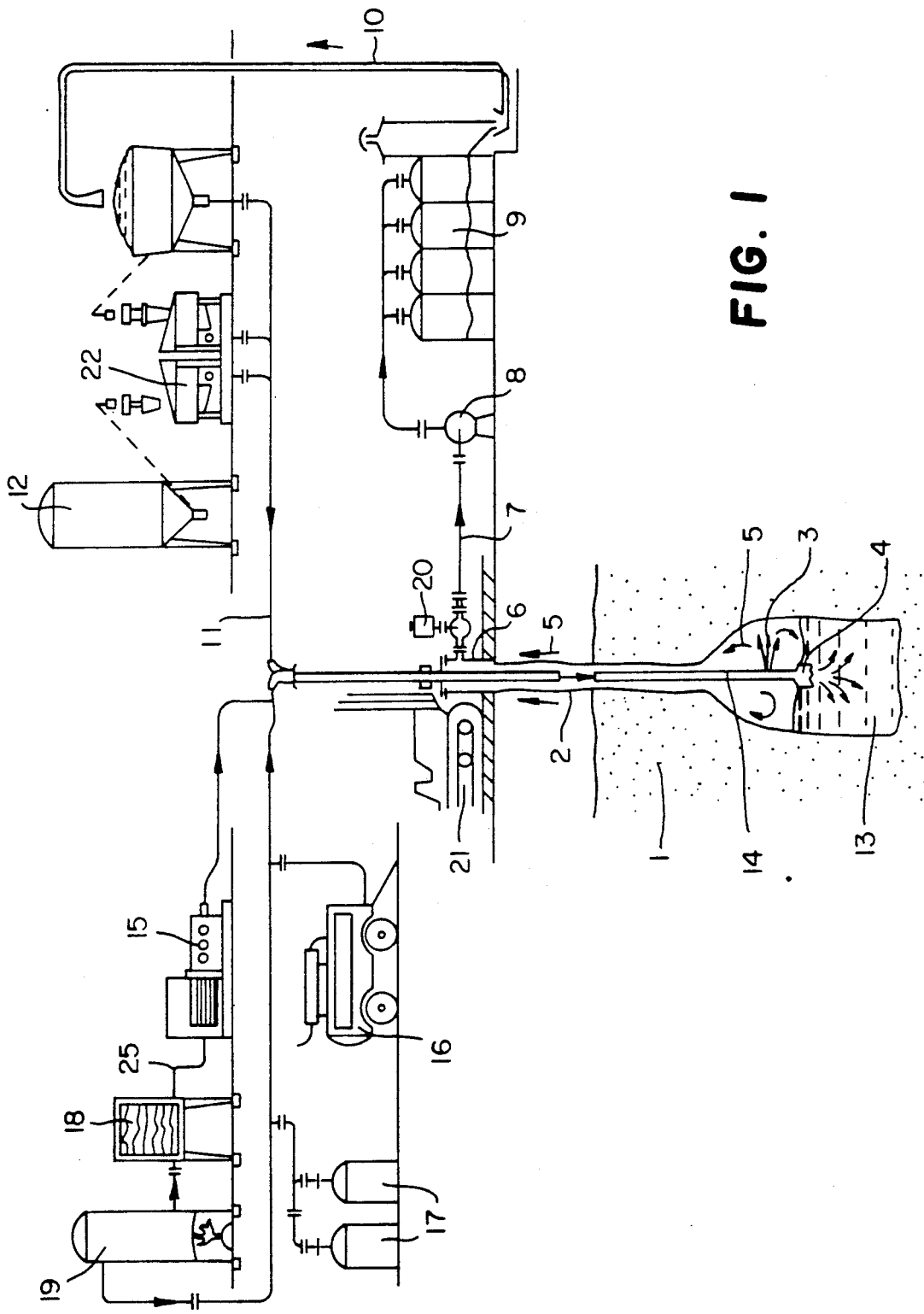
FIG. 1 is a diagrammatic view, partially in section, of a process and device in accordance with the invention.

As can be seen in FIG. 1, vertical or inclined borehole 2 is produced in the contaminated soil by drilling equipment 21. Cutting device 4 which, via a pipeline system 14, is driven by high-pressure pump 15, is arranged in borehole 2 so that it may be lifted or lowered, as well as rotated. At its lower end, cutting device 4 produces high-energy flushing and cutting jet 3 which extracts contaminated soil 1 from the existing soil structure and flushes it so intensely that it is largely freed from its adhering pollutants.

In return flow 5 leading to the surface, the fine particles of the flushed and precleaned soil, together with the extracted pollutants, are sluiced in the form of a slurry through preventer 6 and conveyed by pump 8 to decontamination plant 9. In plant 9, the fine soil particles are freed from their remaining pollutants, whereas the coarse soil particles remain in the ground.

Via suitable pipeline system 11, soil 10 which was cleansed in the decontamination plant 9, together with a bonding agent (for example, cement) from tank 12, is returned to borehole 2 where it forms soil structure 13 capable of bearing loads. As can be seen, the bonding agent is added in mixing plant 22 which serves to add a metered amount of bonding agent to cleansed soil 10 and to mix the components. Suction line 25 of pipeline system 14 of high-pressure pump 15 is provided with connections for air from tank 16, gas from containers 17, hot water 18, and steam from boiler 19, thereby assisting the process of decontaminating soil 1.

There is also provided measuring and control unit 20 which, in the embodiment shown, follows preventer 6 and serves continuously to determine, monitor, and control, in return flow 5, the degree of decontamination of soil 1. This operation is continued until the desired degree of decontamination of the soil 1, combined with achievement of its full load-bearing capacity, has been reached.

Figure 2:
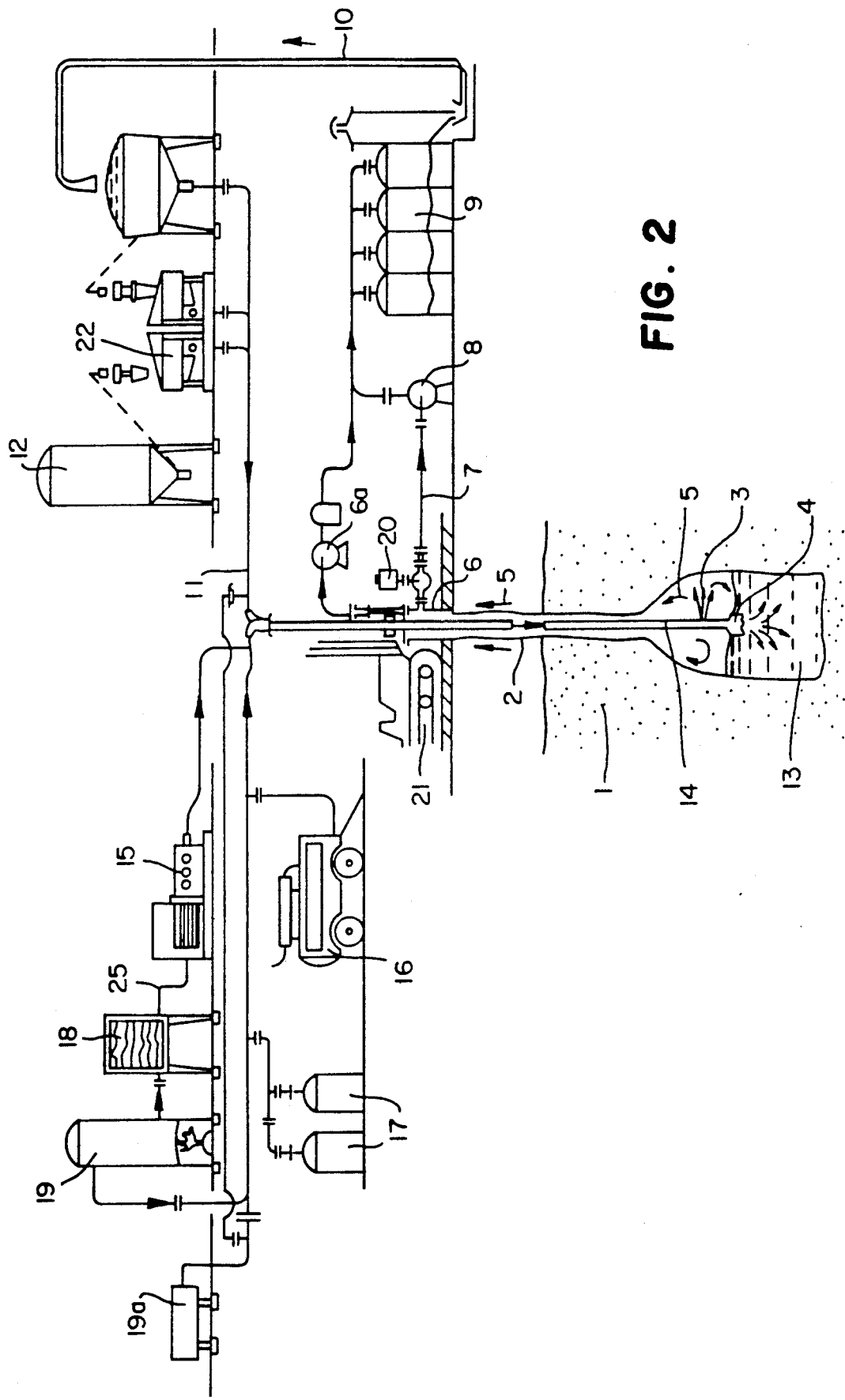
FIG. 2 is a view similar to that of FIG. 1 showing a modified embodiment thereof.

The modified embodiment of FIG. 2, inter alia, differs from that of FIG. 1 in that preventer 6 is connected to vacuum pump 6a, thereby maintaining preventer 6 under vacuum. This insures that the pollutants contained in return flow 5 are always drawn inwardly and, in consequence, do not escape into the atmosphere. In this way, the site personnel and the environment are protected. At the same time, the vacuum in preventer 6 insures that return flow 5 out of borehole 2 is of a uniform nature and not subject to irregularities.

Furthermore, pipeline system 14 has been provided with a connection for adding a bio-substance from reservoir 19a, thereby permitting the required amount, concentration etc. thereof to be added to contaminated soil 1 while being extracted, while flushing and cutting jet 3 provides thorough mixing so that bio-substance 19a can exert its full influence on contaminated soil 1 by biochemically decomposing and altering the pollutants.

Via an additional line 23, the pipe provided for introducing bio-substance 19a is also connected to pipeline system 11 which returns cleansed soil 10 to borehole 2. In this way, it is possible to add bio-substance 19a also to cleansed soil 10, either shortly before, or in the course of, its return to borehole 2.

What we claim is:

1. A process for decontamination of contaminated soil comprised of fine particles and coarse particles comprising subjecting the contaminated soil in a bore hole to a high pressure stream of a flushing and cutting jet to flush fine particles out of the bore hole with the coarse particles remaining in the bore hole, the jet being adapted for vertical movement and rotation in the bore hole, conveying the fine particles to a decontaminating plant by a return flow, cleaning the fine particles in the decontamination plant, adding a bonding agent to the fine particles to form a bonding mixture and returning the bonding mixture to the bore hole to form together with the coarse particles a soil structure capable of bearing loads.

2. The process of claim 1 wherein said stream comprises water.

3. The process of claim 2 wherein said water is hot.

4. The process of claim 1 wherein said stream comprises at least one member of the group consisting of hot water, steam, and air.

5. The process of claim 1 wherein said stream is air whereby gaseous poisons are removed from said contaminated soil.

6. The process of claim 1 wherein said bonding agent is cement.

7. The process of claim 1 comprising monitoring said return flow and, based thereon, controlling decontamination of said contaminated soil.

8. The process of claim 7 wherein said decontamination is carried out to a predetermined degree.

9. The process of claim 1 wherein said return flow is subjected to a vacuum.

10. The process of claim 1 wherein a biologically active substance is introduced into said stream, thereby causing at least some decomposition of said pollutants.

11. The process of claim 1 wherein a biologically active substance is introduced into at least one member of the group consisting of said fine particles and said bonding mixture, thereby causing at least some decomposition of said pollutants.

12. A device for decontamination of contaminated soil comprising a flushing and cutting device adapted to produce a jet stream, said device being adapted to be inserted in a borehole in contaminated soil, said device being movable vertically in said borehole and rotatable about its axis, a decontamination plant fluidly connected to a return stream from said borehole and having means to cleanse fine particles of said contaminated soil to form cleansed particles, means connected to said decontamination plant for mixing fine particles flowing out of said plant with a bonding agent to form a bonding mixture, transporting means from said plant for carrying said bonding mixture back into said borehole to thereby form a soil structure capable of bearing loads.

13. The device of claim 12 wherein said jet stream comprises steam and/or hot water.

14. The device of claim 12 wherein said jet stream comprises air.

15. The device of claim 12 further comprising a measuring and controlling unit for monitoring pollutants in flow and, based thereon, controlling said device.

16. The device of claim 12 wherein there is provided a vacuum pump fluidly connected to said return flow whereby said flow is maintained under vacuum.

17. The device of claim 12 comprising means for introducing a biologically active substance into said contaminated soil and/or cleansed particles, whereby pollutants in said contaminated soil are decomposed.

18. The device of claim 17 wherein said biological substance is a microorganism.

* * * * *